United States Patent [19]

Motosugi et al.

[11] Patent Number: 4,523,560
[45] Date of Patent: Jun. 18, 1985

[54] INTAKE DEVICE OF AN INTERNAL COMBUSTION ENGINE

[75] Inventors: Katsuhiko Motosugi; Yoshio Sasaki, both of Toyota, Japan

[73] Assignee: Toyota Jidosha Kogyo Kabushiki Kaisha, Toyota, Japan

[21] Appl. No.: 580,288

[22] Filed: Feb. 17, 1984

Related U.S. Application Data

[63] Continuation of Ser. No. 326,264, Dec. 1, 1981, abandoned.

[30] Foreign Application Priority Data

Dec. 2, 1980 [JP] Japan ............................. 55-169048

[51] Int. Cl.³ .............................................. F02B 31/00
[52] U.S. Cl. ................................... 123/308; 423/432
[58] Field of Search ........... 123/308, 432, 568, 188 M

[56] References Cited

U.S. PATENT DOCUMENTS

| | | | |
|---|---|---|---|
| 3,359,958 | 12/1967 | Seggern et al. | 123/75 |
| 3,814,069 | 6/1974 | Croft et al. | 123/52 M |
| 4,194,474 | 3/1980 | Endo | 123/119 A |
| 4,196,701 | 4/1980 | Tamura et al. | 123/30 C |
| 4,214,561 | 7/1980 | Matsumoto et al. | 123/432 |
| 4,240,387 | 12/1980 | Motosugi et al. | 123/52 M |
| 4,261,316 | 4/1981 | Motosugi et al. | 123/568 |
| 4,262,639 | 4/1981 | Motosugi et al. | 123/568 |
| 4,271,801 | 6/1981 | Yamakawa et al. | 123/308 |
| 4,291,655 | 9/1981 | Yamakawa | 123/309 |
| 4,300,500 | 11/1981 | Motosugi et al. | 123/308 |
| 4,303,046 | 12/1981 | Nakanishi et al. | 123/308 |
| 4,317,438 | 3/1982 | Yagi et al. | 123/432 |
| 4,354,463 | 10/1982 | Otani et al. | 123/568 |
| 4,359,981 | 11/1982 | Kanda et al. | 123/193 H |

FOREIGN PATENT DOCUMENTS

| | | | |
|---|---|---|---|
| 2816341 | 10/1978 | Fed. Rep. of Germany . | |
| 47724 | 3/1970 | Japan | 123/432 |
| 152713 | 12/1979 | Japan | 123/568 |
| 5446 | 1/1980 | Japan | 123/308 |
| 19945 | 2/1980 | Japan | 123/308 |
| 55-25533 | 2/1980 | Japan | 123/308 |
| 55-19943 | 2/1980 | Japan | 123/308 |
| 54661 | 4/1980 | Japan | 123/432 |
| 55-78157 | 6/1980 | Japan | 123/308 |
| 98647 | 7/1980 | Japan | 123/568 |
| 1204434 | 9/1970 | United Kingdom . | |

Primary Examiner—Ira S. Lazarus
Assistant Examiner—R. S. Bailey
Attorney, Agent, or Firm—Kenyon & Kenyon

[57] ABSTRACT

An internal combustion engine having a plurality of cylinders each comprising a first intake valve, a first intake passage connected to the corresponding cylinder via the first intake valve, a second intake valve, and a second intake passage connected to the corresponding cylinder via the second intake valve. A second throttle valve is provided for each second intake passage and opens when the load of the engine is increased beyond a predetermined level. A blind common connecting passage is provided, which has a plurality of branch passages each being open to the corresponding second intake passage located downstream of the corresponding second throttle valve.

12 Claims, 6 Drawing Figures

INTAKE DEVICE OF AN INTERNAL COMBUSTION ENGINE

This application is a continuation-in-part, of application Ser. No. 06/326,264, filed Dec. 1, 1981, now abandoned.

BACKGROUND OF THE INVENTION

The present invention relates to an intake device of a multi-cylinder internal combustion engine.

As an internal combustion engine for obtaining a high output, there is known a multi-cylinder internal combustion engine in which each cylinder is provided with a first intake port for low-speed driving having a first intake valve for low-speed driving and a second intake port for high-speed driving having a second intake valve for high-speed driving. Said first intake port and said second intake port of each cylinder communicate with ambient air through a common first throttle valve, and a normally closed second throttle valve is arranged in the second intake port of each cylinder downstream of the first throttle valve so that when the engine load or engine rotation number exceeds a predetermined value, said second throttle valve opens. In this multi-cylinder internal combustion engine, at the time of low or medium engine load driving or low or medium engine speed driving, the second throttle valve closes and, therefore, air is supplied into the engine cylinder only through the first intake valve. On the other hand, at the time of high engine load driving or high engine speed driving, since the second throttle valve opens, air is supplied into the engine cylinder through the first intake valve and second intake valve. In the internal combustion engine of this type, since air is supplied into the engine cylinder through the first and second intake valves at the time of high engine load driving or high engine speed driving as described above, the volumetric efficiency is increased and there can be obtained a higher output than the output obtainable in the case where only one intake valve is arranged. However, at the time of low or medium engine load driving where only the first intake valve is open, the degree of turbulence produced in the engine cylinder is low and the burning velocity is low, with the result that stable combustion cannot be obtained and specific fuel consumption is increased. Moreover, there arises a problem of unstable ignition. For solving these problems, there has been proposed an internal combustion engine in whrch a helical type intake port is used as the first intake port, or a shroud is formed for the first intake valve to produce a strong swirling stream in the combustion chamber. However, such helical intake port or shroud valve offers a great degree of resistance to air, and, therefore, the volumetric efficiency is reduced at the time of high engine load driving or high engine speed driving, with the result that a high output cannot be obtained.

SUMMARY OF THE INVENTION

An object of the present invention is to provide an intake apparatus of a multi-cylinder internal combustion engine in which, at the time of low or medium engine load driving, a high degree of turbulence is produced in a combustion chamber to improve the state of combustion, while maintaining a high output of the engine.

According to the present invention, there is provided a multi-cylinder internal combustion engine having a plurality of cylinders each comprising a combustion chamber, a first intake valve arranged in the combustion chamber, a first intake passage having an inlet and an outlet which is connected to the combustion chamber via the first intake valve, a second intake valve arranged in the combustion chamber, a second intake passage having an inlet and an outlet which is connected to the combustion chamber via the second intake valve, a common intake passage connected to the inlets of the first intake passage and the second intake passage, a first throttle valve arranged in the common intake passage, and normally closed second throttle valves each being arranged in the corresponding second intake passage and opened when the engine load or the engine speed is increased beyond a predetermined level, wherein the improvement comprises a blind common connecting passage having a plurarity of branch passages each being open to said corresponding second intake passage located downstream of said corresponding second throttle valve.

The present invention may be more fully understood from the description of a preferred embodiment of the invention set forth below, together with the accompanying drawings.

DETAILED DESCRIPTION OF A PREFERRED EMBODIMENT

Figure 1:
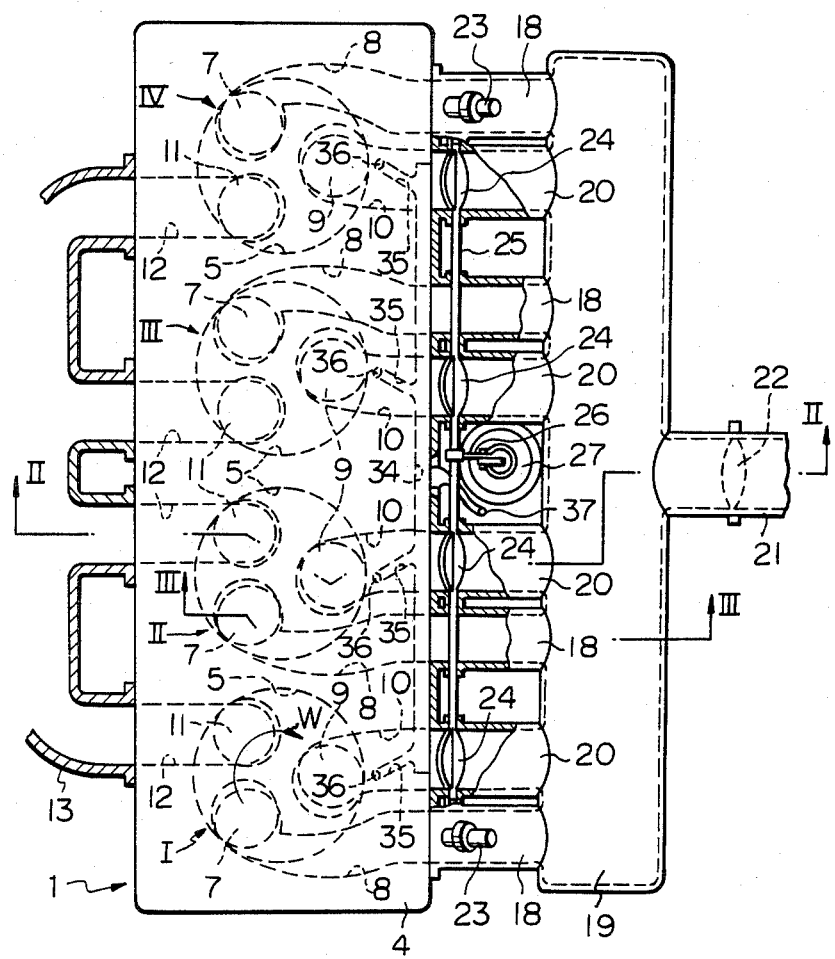
FIG. 1 is a partially cross-sectional plan view of an internal combustion engine according to the present invention.

In FIGS. 1 through 5, reference numerals 1, 2, 3 and 4 designate an engine body, a cylinder block, a piston reciprocally moving in the cylinder block 2 and a cylinder head secured onto the cylinder block 2, respectively. A combustion chamber 5 is formed between the top face of the piston 3 and the inner wall face of the cylinder head 4. Reference numerals 6, 7, 8, 9, 10, 11, 12 and 13 designate a spark plug, a first intake valve for low-speed driving, a first intake port for low-speed driving formed within the cylinder head 4 and connected to the interior of the combustion chamber 5 through the first intake valve 7, a second intake valve for high-speed driving, a second intake port for high-speed driving formed within the cylinder head 4 and connected to the interior of the combustion chamber 5 through the second intake valve 9, an exhaust valve, an exhaust port and an exhaust manifold connected to each exhaust port 12, respectively. In FIG. 1, I, II, III and IV designate a first cylinder, a second cylinder, a third cylinder and a fourth cylinder, respectively.

Figure 2:
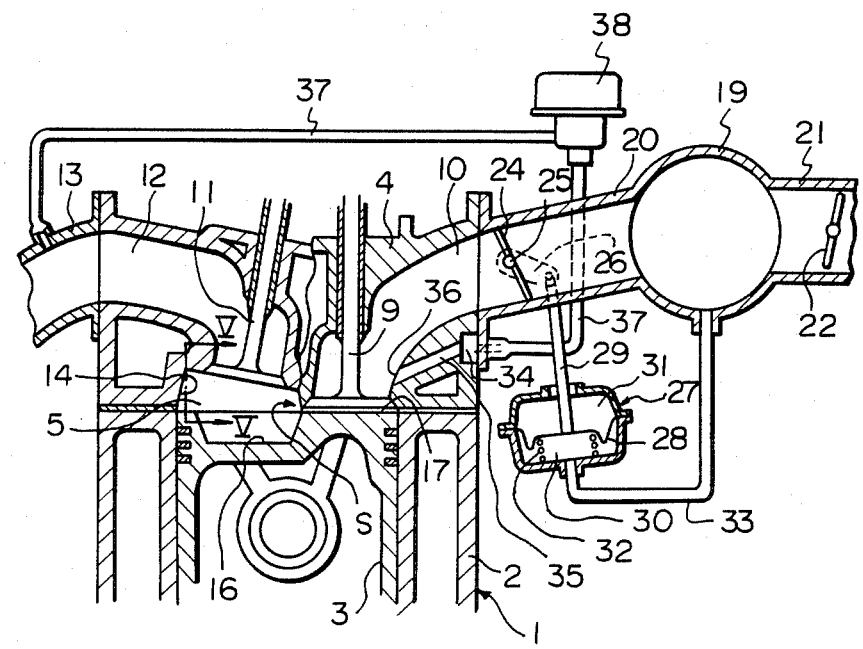
FIG. 2 is a cross-sectional side view taken along the line II—II in FIG. 1.
Figure 3:
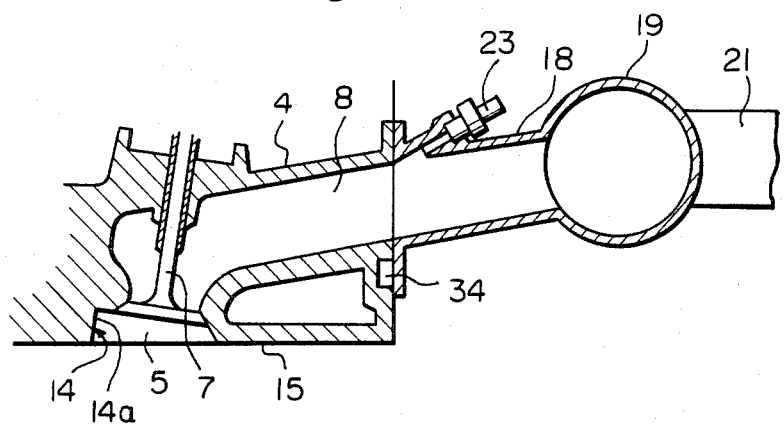
FIG. 3 is a cross-sectional side view taken along the line III—III in FIG. 1.
Figure 4:
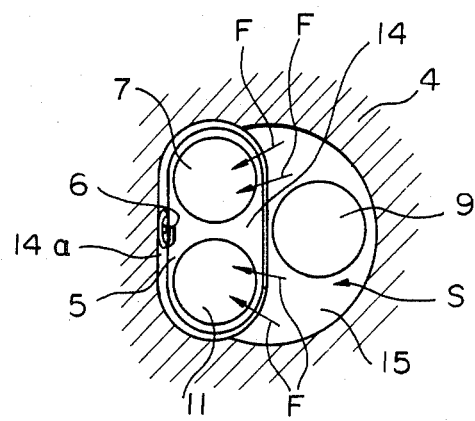
FIG. 4 is a bottom view of the cylinder head shown in FIG. 2.
Figure 5:
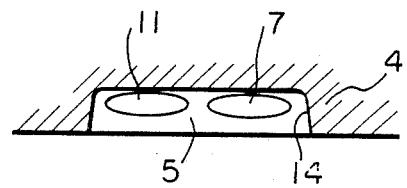
FIG. 5 is a cross-sectional side view taken along the line V—V in FIG. 2.

As shown in FIGS. 2 through 5, a long concave groove 14 is formed on the inner wall face 15 of the cylinder head 4, and the inner wall face 15, except for this concave groove 14, of the cylinder head 4 is made flat. As shown in FIGS. 4 and 5, the first intake valve 7 and the exhaust valve 11 are arranged on the top face of the concave groove 14, and, as shown in FIGS. 2 and 4, the second intake valve 9 is arranged on the flat inner wall face 15 of the cylinder head 4. A recess 16 is formed on the top face of the piston 3 to confront the concave groove 14, and the top end portion 17 of the piston 3, which confronts the flat inner wall face 15 of the cylinder head 4, is made flat. Accordingly, as shown in FIG. 2, when the piston 3 arrives at the top dead center, a substantially semicircular squish area S corresponding to approximately ⅓ to ½ of the sectional area of the piston 3 is formed between the flat top end portion 17 of the piston 3 and the flat inner wall face 15 of the cylinder head 4. As shown in FIG. 4, the spark plug 6 is arranged on the circumferential wall face 14a of the concave groove 14 on the side opposite to the side of the squish area S between the first intake valve 7 and the exhaust valve 11.

Figure 6:
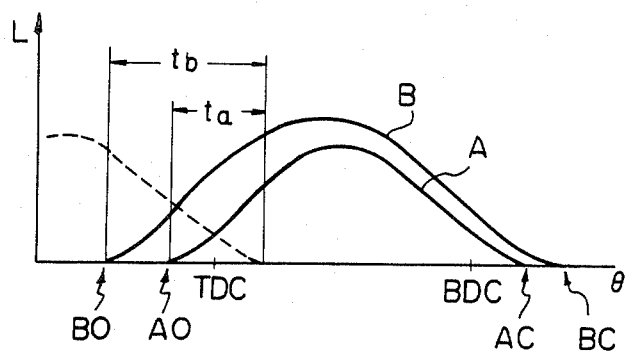
FIG. 6 is a diagram illustrating the valve-opening times of intake and exhaust valves.

The first intake valve 7, second intake valve 9 and exhaust valve 11 are driven by a cam mechanism (not shown), and the period during which the second intake valve 9 is open is longer than the period during which the first intake valve 7 is open. In FIG. 6, curve A shows the valve lift of the first intake valve 7, and curve B shows the valve lift of the second intake valve 9. In FIG. 6, the ordinate L indicates the valve lift, and the abscissa $\theta$ indicates the crank angle. Referring to FIG. 6, the valve-opening time AO of the first intake valve 7 and the valve-opening time BO of the second intake valve 9 are before the top dead center TDC, and it can be seen that the valve-opening time BO of the second intake valve 9 is earlier than the valve-opening time AO of the first intake valve 7. Furthermore, it can be seen that the valve-closing time BC of the second intake valve 9 is later than the valve-closing time AC of the first intake valve 7. Incidentally, in FIG. 6, the broken line indicates the valve lift of the exhaust valve 11. Accordingly, during the period ta, both the first intake valve 7 and the exhaust valve 11 are open, and during the period tb, both the second intake valve 9 and the exhaust valve 11 are open. Thus, it can be seen that the valve overlap time of the second intake valve 9 is longer than that of the first intake valve 7.

Referring to FIGS. 1 through 3, the second intake valve 9 is larger than the first intake valve 7, and the sectional area of the second intake port 10 is larger than the sectional area of the first intake port 8. Furthermore, the second intake port 10 extends with a smooth curve, while the first intake port 8 is formed so that it has a helical shape. Incidentally, the helical type first intake port 8 is formed so that the flow resistance is less than in the ordinary helical type intake port. Accordingly, the degree of turbulence produced in the combustion chamber 5 by this helical type first intake port 8 is slightly less than the degree of turbulence produced by the ordinary helical type intake port, but the volumetric efficiency is reduced only slightly at the time of high engine speed driving or high engine load driving. The first intake port 8 is connected to a surge tank 19 through a corresponding first branch pipe 18, and the second intake port 10 is connected to the surge tank 19 through a second brach pipe 20. The surge tank 19 is connected to an air cleaner (not shown) through a suction pipe 21, and the first throttle valve 22 is arranged in this suction pipe 21. The first throttle valve 22 is connected to an accelerator pedal (not shown) arranged in the driver's compartment. A fuel injector 23 is arranged on each branch pipe 18, and fuel is injected from the fuel injector 23 into the corresponding first intake ports 8.

Second throttle valves 24 are arranged in the outlets of the respective second branch pipes 20, and these second throttle valves 24 are secured on a common throttle shaft 25. An arm 26 is secured to this throttle shaft 25, and the top end portion of the arm 26 is connected to a control rod 29 secured to a diaphragm 28 of a vacuum operated diaphragm apparatus 27.

The diaphragm apparatus 27 comprises a vacuum chamber 30 and an atmospheric pressure chamber 31, which are separated from each other by the diaphragm 28. The diaphragm 28, biased towards the atmospheric pressure chamber 31 by a compression spring 32, is inserted into the vacuum chamber 30, and the vacuum chamber 30 is connected to the interior of the surge tank 19 through a vacuum conduit 33.

A common connecting passage 34 extending in the longitudinal direction of the cylinder head 4 is formed in the cylinder head 4, and this common connecting passage 34 is connected to the respective second intake ports 10 through branch passages 35 having a sectional area much smaller than the sectional area of the second intake ports 10. As shown in FIGS. 1 and 2, an opening 36 of each branch passage 35 is arranged in the vicinity of the rear face of the valve head of the second intake valve 9, and when the second intake valve 9 opens, the opening 36 is directed to a gap formed between the second intake valve 9 and its valve seat. For example, in the first cylinder I, at the intake stroke, a swirling stream flowing in the direction of the arrow W is formed in the combustion chamber 5 by an air-fuel mixture flowing into the combustion chamber 5 from the first intake port 8, and the opening 36 of the branch passage 35 is directed tangentially to the circumferential wall face of the combustion chamber 5 in the same circumferential direction as the direction W of the swirling stream. The central portion of the common connecting passage 34 is connected to the exhaust manifold 13 through an exhaust gas recirculation conduit 37 and an exhaust gas recirculation control valve 38. Accordingly, the exhaust gas in the exhaust manifold 13 is supplied into the common connecting passage 34 through the exhaust gas recirculation conduit 37.

At the time of low or medium engine load driving when the degree of opening of the first throttle valve 22 is low, as shown in FIG. 2, the level of vacuum in the surge tank 19 is high and the diaphragm 28 is brought down against the compression spring 32, with the result that the second throttle valve 24 is turned in a clockwise direction, and a completely closed state is maintained, as shown in FIG. 2. Accordingly, air sucked into the surge tank 19 at this time is allowed to flow into the combustion chamber 5 only through the first intake port 8 and the first intake valve 7. As described hereinbefore, fuel is projected toward the first intake port 8 from the fuel injector 23. Accordingly, an air-fuel mixture is formed in the first intake port 8, and the so-formed air-fuel mixture flows into the combustion chamber 5 through the first intake valve 7. Furthermore, since the first intake port 8 is formed so that it has a helical shape as described hereinbefore, when the first cylinder I is at the intake stroke, in the combustion chamber 5 of the first cylinder I, a swirl motion indicated by the arrow W is produced by the air-fuel mixture flowing from the first intake port 8.

If the order of ignition is I-III-IV-II, when the first cylinder I is at the intake stroke, the second cylinder II is at the exhaust stroke. At the intake stroke of the first cylinder I, the second intake valve 9 opens but the second throttle valve 24 remains completely closed. Accordingly, the pressure in the second intake port 10 of the first cylinder I is substantially equal to the pressure in the combustion chamber 5. At the time of low or medium engine load driving, the level of vacuum in the combustion chamber 5 at the intake stroke is high, and therefore, at this time, the level of vacuum in the second intake port 10 of the first cylinder I is much higher than the level of vacuum in the second intake ports 10 of the other cylinders II, III and IV. Accordingly, air-fuel mixtures in the second intake ports 10 of the other cylinders II, III and IV are caused to flow into the common connecting passage 34 through the corresponding branch passages 35, and the air-fuel mixture thus introduced into the common connecting passage 34 is spouted at a high speed into the second intake port 10 of the first cylinder I through the corresponding branch passage 35. As described hereinbefore, the opening 36 of the branch passage 35 is directed to the gap between the second intake valve 9 and its valve seat and also to the periphery of the combustion chamber 5. Accordingly, the air-fuel mixture spouted from the branch passage 35 passes through the gap between the second intake valve 9 and its valve seat and flows at a high speed into the combustion chamber 5, with the result that the rotating speed of the swirl motion W is increased.

As can be seen from FIG. 6, at the end of the intake stroke of the first cylinder I, the second intake valve 9 of the second cylinder II which is in the exhaust stroke is opened, with the result that the combustion gas in the combustion chamber 5 is blown back into the second intake port 10 of the second cylinder II. At this time, since the second throttle valve 24 remains completely closed, a large amount of positive pressure is produced in the second intake port 10 of the second cylinder II, with the result that the difference between the pressure in the second intake port 10 of the second cylinder II and the pressure in the second intake port 10 of the first cylinder I is increased and, therefore, the combustion gas or air-fuel mixture in the second cylinder II is spouted from the branch passage 35 of the first cylinder I through the common connecting passage 34, and the rotating speed of the swirl motion W in the combustion chamber 5 is further increased. As is apparent from the foregoing description, at the time of low or medium engine load driving a strong swirl motion is produced in the combustion chamber 5 by the air-fuel mixture spouted from the opening 36 of the branch passage 35.

When the piston 3 then comes close to the top dead center, a squish flow is spouted from the squish area S, as indicated by the arrow F in FIG. 4, and a high degree of turbulence is produced in the combustion chamber 5. When the air-fuel mixture is then ignited by the spark plug 6, since a high degree of turbulence is produced in the combustion chamber 5 by the strong swirl motion W and squish flow F as described hereinbefore, flames rapidly propagate in the combustion chamber 5. When the piston 3 arrives at the top dead center, since the clearance between the flat top end portion 17 of the piston 3 and the flat inner face portion 15 of the cylinder head 4 within the squish area S becomes smaller than the quench distance, the flames do not propagate into the squish area S. When the piston 3 is then brought down, since a temporary reduction of the pressure is brought about in the squish area S, flames in the combustion chamber 5 are sucked into the squish area S and the unburnt air-fuel mixture in the squish area S is burnt.

Incidentally, since the spark plug 6 is disposed on the side opposite to the side of the squish area S, the flames of the air-fuel mixture ignited by the spark plug 6 propagate toward the squish area S. Accordingly, when a temporary reduction of the pressure is brought about in the squish area S in the above-mentioned manner, flames can propagate promptly into the squish area S. Therefore, the burning velocity is increased and stable combustion can be maintained assuredly. Knocking is due to self-ignition of an unburnt air-fuel mixture caused when the unburnt air-fuel mixture located apart from the spark plug 6 is compressed by an increase of the combustion pressure. The occurrence of knocking can be prevented by arranging the low-temperature second intake valve 9 at a position apart from the spark plug 6 and forming a squish area S having a flame-extinguishing function.

At the time of high engine load driving when the degree of opening of the first throttle valve 22 is high, since the level of vacuum in the surge tank 19 is low, the diaphragm 28 is lifted up by the spring force of the compression spring 32, with the result that the second throttle valve 24 is turned in a counterclockwise direction and opens completely. Accordingly, air in the surge tank 19 is supplied into the combustion chamber 5 through the first intake port 8 and the second intake port 10. Since the first intake port 8 is formed so that it has little flow resistance as described hereinbefore and the valve-opening time of the second intake valve 9 is earlier than the first intake valve 7, a high volumetric efficiency can be maintained at the time of high engine load driving or high engine speed driving, and, hence a high output can be obtained.

It is preferred that the second throttle valve 24 be open when the level of vacuum in the surge tank 19 is less than −60 through −90 mmHg. Accordingly, the area of the diaphragm 28 and the spring force of the compression spring 32 are determined so that the second throttle valve 24 is open when the level of vacuum in the surge tank 19 is smaller than −60 through −90 mmHg. Incidentally, in the embodiment shown in FIG. 2, the second throttle valve 24 is controlled according to changes of the level of vacuum in the surge tank 19. However, in the present invention, the second throttle valve 24 may be controlled according to changes of the rotating speed of the engine or the speed of the vehicle. Since air-fuel mixtures in the second intake ports 10 of the respective cylinders are mixed through the common connecting passage 34, the irregularity of the air-fuel ratio among the respective cylinders can be reduced, and furthermore, by recirculating the exhaust gas into the common connecting passage 34, good distribution of the recirculated exhaust gas can be maintained among the respective cylinders.

As will be apparent from the foregoing description, according to the present invention, strong turbulence can be produced in the combustion chamber at the time of low or medium engine load driving, while a high volumetirc efficiency can be obtained at the time of high engine load driving or high engine speed driving. Since strong turbulence can thus be produced in the combustion chamber at the time of low or medium engine load driving, the burning velocity can be increased and the air-fuel ratio can be increased while increasing the amount of recirculated exhaust gas. Moreover, since stable combustion can be maintained at the time of low engine load driving, the idling speed of the engine can be reduced. Furthermore, since the combustion chamber is constructed as to prevent the occurrence of knocking, the compression ratio can be increased. Still further, srnce the valve overlap time of the second intake valve is longer than that of the first intake valve, the volumetric efficiency can be enhanced and, simultaneously, the speed of the air-fuel mixture spouted from each branch passage of the common connecting passage can be increased. The present invention has been described hereinbefore with reference to a fuel injection type internal combustion engine. As is obvious to those skilled in the art, the present invention can similarly be applied to a carburetor type engine.

While the invention has been described by reference to a specific embodiment chosen for purposes of illustration, it should be apparent that numerous modifications could be made thereto by those skilled in the art without departing from the basic concept and scope of the invention.

We claim:

1. A multi-cylinder internal combustion engine having a cylinder head and a plurality of cylinders, each cylinder having a combustion chamber, a first intake valve arranged in the combustion chamber, a first intake passage having an inlet and an outlet which is connected to the combustion chamber via the first intake valve, a second intake valve arranged in the combustion chamber, a second intake passage having an inlet and an outlet which is connected to the combustion chamber via the second intake valve, a common intake passage connected to the inlets of the first intake passage and the second intake passage, a first throttle valve arranged in the common intake passage, and a normally closed second throttle valve arranged in the second intake passage and opened when the engine load or the engine speed is increased beyond a predetermined level, wherein the improvement comprises a blind common connecting passage, a plurality of branch passages extending from the blind common connecting passage, each branch passage being open to said second intake passage of a corresponding cylinder at a location downstream of said second throttle valve of the corresponding cylinder, each of said branch passages having an opening arranged in the vicinity of a valve head of a corresponding second intake valve, directed to a gap formed between said valve head and a valve seat of said corresponding second intake valve, and directed tangentially to a circumferential wall of the corresponding combustion chamber, the second throttle valve of each cylidner being closed when a selectable one of the speed and load of the engine is below a predetermined level.

2. A multi-cylinder internal combustion engine according to claim 1, wherein said engine comprises a piston having a flat top face portion and the cylinder head has a concave groove and a flat inner wall portion, said flat top face portion cooperating with said flat inner wall portion to form a squish area therebetween when the piston reaches the top dead center.

3. A multi-cylinder internal combustion engine according to claim 2, wherein each of said first intake valves is arranged on a top face of said concave groove, and each of said second intake valves is arranged on the flat inner wall portion of the cylinder head.

4. A multi-cylinder internal combustion engine according to claim 2, wherein said engine comprises a spark plug arranged in said concave groove at a position opposite to said squish area.

5. A multi-cylinder internal combustion engine according to claim 2, wherein said piston has a recess formed on a top face thereof and arranged to face said concave groove.

6. A multi-cylinder internal combustion engine according to claim 1, wherein the length of time during which said second intake valves are open is longer than the length of time during which said first intake valves are open.

7. A multi-cylinder internal combustion engine according to claim 6, wherein the opening time of each of said second intake valves is earlier than that of said corresponding first intake valves.

8. A multi-cylinder internal combustion engine according to claim 1, wherein said second intake passages have a cross-sectional area which is larger than that of said first intake passage.

9. A multi-cylinder internal combustion engine according to claim 8, wherein each of said first intake passages includes a helically shaped intake port formed around said corresponding intake valves.

10. A multi-cylinder internal combustion engine according to claim 1, wherein said engine comprises an exhaust passage and an exhaust gas recirculation apparatus connecting said exhaust passage to said common connecting passage for recirculating an exhaust gas into said common connecting passage.

11. A multi-cylinder internal combustion engine according to claim 1, wherein said engine comprises a vacuum operated diaphragm apparatus for actuating said second throttle valves in response to change in the level of vacuum produced in said common intake passage which is located downstream of said first throttle valve.

12. A multi-cylinder internal combustion engine according to claim 1, wherein said engine comprises a plurality of fuel injectors each being arranged in the first intake passage.

* * * * *

UNITED STATES PATENT AND TRADEMARK OFFICE
CERTIFICATE OF CORRECTION

PATENT NO. : 4,523,560
DATED : June 18, 1985
INVENTOR(S) : K. Motosugi et al.

It is certified that error appears in the above-identified patent and that said Letters Patent is hereby corrected as shown below:

Column 1, line 5, change "continuation-in-part," to --continuation,--.

Column 2, line 16, change "plurarity" to --plurality--.

Column 3, line 61, change "brach" to --branch--.

Column 5, line 46, change "description at" to --description, at--.

Column 6, line 32, change "and, hence" to --and hence--.

Column 6, line 59, change "volumetirc" to --volumetric--.

UNITED STATES PATENT AND TRADEMARK OFFICE
CERTIFICATE OF CORRECTION

PATENT NO. : 4,523,560

DATED : June 18, 1985

INVENTOR(S) : K. Motosugi et al.

It is certified that error appears in the above-identified patent and that said Letters Patent is hereby corrected as shown below:

Column 7, line 3, change ", srnce" to --, since--.

Column 7, line 48, change "cylidner" to --cylinder--.

Signed and Sealed this

Tenth Day of December 1985

[SEAL]

Attest:

Attesting Officer

DONALD J. QUIGG

Commissioner of Patents and Trademarks